(12) United States Patent
Taketomi et al.

(10) Patent No.: US 7,967,551 B2
(45) Date of Patent: Jun. 28, 2011

(54) SUCTION FILTER, TURBOCOMPRESSOR, AND METHOD FOR COMPACT ASSEMBLING OF THE SAME

(75) Inventors: Toshimichi Taketomi, Chiyoda-ku (JP); Kazumitsu Hasegawa, Chiyoda-ku (JP); Yoshitaka Sasaki, Chiyoda-ku (JP); Yoshiyuki Ogawa, Chiyoda-ku (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 12 days.

(21) Appl. No.: 12/554,053

(22) Filed: Sep. 4, 2009

(65) Prior Publication Data
US 2009/0320283 A1 Dec. 31, 2009

Related U.S. Application Data

(62) Division of application No. 10/544,786, filed as application No. PCT/JP2004/003771 on Mar. 19, 2004, now Pat. No. 7,621,717.

(30) Foreign Application Priority Data

Mar. 26, 2003  (JP) .................................. 2003-085407
Apr. 3, 2003  (JP) .................................. 2003-100336

(51) Int. Cl.
*F04D 25/00* (2006.01)
*F04D 25/16* (2006.01)
*F04D 29/58* (2006.01)

(52) U.S. Cl. ......... 415/60; 415/66; 415/122.1; 415/134; 415/179; 415/199.1

(58) Field of Classification Search .................... 415/60, 415/66, 122.1, 134, 179, 199.1; 55/385.3, 55/DIG. 17, DIG. 21, DIG. 30; 123/198 E, 562, 316, 90.15–90.18; 60/602, 605.1; 96/380–388
See application file for complete search history.

(56) References Cited

U.S. PATENT DOCUMENTS

| 1,425,855 A | 8/1922 | Graemiger |
| 3,001,692 A | 9/1961 | Schierl |
| 3,014,639 A | 12/1961 | Boli |
| 3,476,485 A | 11/1969 | Kunderman |
| 4,045,157 A | 8/1977 | Peterson |

(Continued)

FOREIGN PATENT DOCUMENTS

CH  136 033  10/1929

(Continued)

*Primary Examiner* — Duane Smith
*Assistant Examiner* — Minh-Chau Pham
(74) *Attorney, Agent, or Firm* — Oblon, Spivak, McClelland, Maier & Neustadt, L.L.P.

(57) ABSTRACT

A casing provided centrally with a sealed structure chamber. Small-sized separate four filter elements are arranged each on opposite sides of the chamber such that inflow air from a suction section into the casing is introduced via the filter elements into the chamber. Each filter element is detachably fitted over a filter-element mount having openings at its outer periphery. Upon filter-element replacement, the filter elements are replaced individually by opening a window. An integral cast casing having compressing sections and compressed air passages integrally fabricated therewith by casting is formed with receptacles for first and second intercoolers and an aftercooler. The intercoolers and aftercooler are received in the receptacles. Outlets of the intercoolers are connected with suction sides of second- and third-stage compressors through second- and third-stage suction pipes, respectively. A blowoff silencer is arranged between the integral cast casing and an oil tank.

2 Claims, 8 Drawing Sheets

U.S. PATENT DOCUMENTS

| | | | |
|---|---|---|---|
| 5,571,299 A | 11/1996 | Tonn | |
| 6,460,337 B1 | 10/2002 | Olofsson | |
| 6,488,467 B2 | 12/2002 | Czechowski et al. | |
| 6,883,319 B2 | 4/2005 | Ekenberg | |
| 7,621,717 B2 * | 11/2009 | Taketomi et al. | 415/60 |
| 2004/0089278 A1 | 5/2004 | Ekenberg | |
| 2005/0172622 A1 * | 8/2005 | Kim et al. | 60/508 |
| 2010/0158710 A1 * | 6/2010 | Umemura et al. | 417/310 |
| 2010/0183465 A1 * | 7/2010 | Kobayashi et al. | 418/55.1 |
| 2010/0186433 A1 * | 7/2010 | Galante et al. | 62/115 |

FOREIGN PATENT DOCUMENTS

| | | |
|---|---|---|
| GB | 546638 | 7/1942 |
| GB | 992788 | 5/1965 |
| GB | 1000134 | 8/1965 |
| JP | 157567/1984 | 10/1984 |
| JP | 83414/1986 | 6/1986 |
| JP | 152099/1989 | 10/1989 |
| JP | 8-68399 | 3/1996 |
| JP | 10-252681 | 9/1998 |

* cited by examiner

BACKGROUND ART

SUCTION FILTER, TURBOCOMPRESSOR, AND METHOD FOR COMPACT ASSEMBLING OF THE SAME

CROSS REFERENCE TO RELATED APPLICATIONS

The present application is a division of U.S. patent application Ser. No. 10/544,786, filed on Aug. 8, 2005, now U.S. Pat. No. 7,621,717 B2, which is incorporated in its entirety herein by reference. U.S. application Ser. No. 10/544,786 is a national stage application of PCT/JP04/03771 filed Mar. 19, 2004.

This application also claims priority under 35 USC §119 to JP application nos. 2003-085407, filed Mar. 26, 2003 and JP 2003-100336, filed Apr. 3, 2003.

TECHNICAL FIELD

The present invention relates to a suction filter on a suction side of a suction line for a compressor. The invention further relates to a turbocompressor, in particular, a turbocompressor in which compressing sections as compressor bodies are assembled together with air coolers and a silencer into a compact assembly and a method for compact assembling of the turbocompressor.

BACKGROUND ART

First, a background art on a suction filter will be described.

Among turbocompressors, a two-stage turbocompressor has been proposed as exemplarily and schematically shown in FIG. 1. More specifically, a first-stage compressor 1 is connected at its suction port 2 to a suction line 4 with a suction valve 3 midway thereof. The suction line 4 has, at its one end or on its suction side, a suction filter 5 with a filter element 6 for removal of foreign matter such as dust. The first-stage compressor 1 is connected at its discharge port 7 to a suction port 9 of a second-stage compressor 8 via a line 10 with an intercooler 11 which cools compressed air to be introduced into the second-stage compressor 8 for reduction of a volume thereof. The second-stage compressor 8 is connected at its discharge port 12 to a discharge line 13 with an aftercooler 14. The line 13 is branched downstream of the aftercooler 14 into a compressed air supply line 15 and a blowoff line 16. The discharge line 13 downstream of the branched point is provided with a pressure switch 17 which controls opening and closing of the suction valve 3 and of a blowoff valve 18 in the blowoff line 16 (See JP 8-121398A).

As disclosed in said JP 8-121398A, the suction filter 5 employed in the conventional turbocompressor comprises, as shown in FIG. 2, a casing 19 with a suction section 20, a discharge section 21 centrally of the casing 19 and communicated with the suction line 4, a large-diameter filter-element mount 22 having peripheral openings communicated with the discharge section 21 and a large-sized cylindrical filter element 6 fitted over the mount 22; air sucked through the suction section 20 opened on a portion of the casing 19 is introduced via the filter element 6 into the discharge section 21 and during such passage of the air the foreign matter such as the dust is removed from the air.

As illustrated, most of such conventional suction filters 5 have the single filter element 6 for the single discharge section 21. Therefore, when replacement of the filter element 6 becomes required during an operation of the compressor due to, for example, clogging of the element, no problem will occur provided that the operation of the compressor can be stopped; however, there may be some cases where the single filter element 6 has to be replaced without stoppage of the operation of the compressor; then, removal of the single filter element 6 for replacement with another one will inevitably bring about no sealing or covering of the opening on the filter-element mount 22 due to the removal of the filter element 6 since suction of air must be continued. As a result, a lot of air is sucked through the uncovered opening on the filter-element mount 22 and there may be a fear that a lot of foreign matter such as dust to be removed by the filter element 6 is sucked without filtering during the replacement work of the filter element. Furthermore, replacement of the filter element requires much time and manpower since the filter element 6 is so large as to be handled by a crane and is hard to be treated.

Accordingly, an object of the invention is to reduce or remove the risk of a lot of foreign matter being sucked even at a replacement work of the filter element during the operation of the compressor and to conduct the replacement work readily and in a small amount of time.

Next, a background art relating to a turbocompressor and a method for compact assembling of the same will be described.

As a turbocompressor used for preparation of compressed air to be supplied to a demand such as a plant, there have been known two- and three-stage turbocompressors depending upon compressed air pressure requirement.

The two-stage turbocompressor is constructed such that it has first- and second-stage compressors with a rotary shaft rotated via a mechanism for speeding up a drive force from a motor to rotate impellers in compressing sections. Air sucked through a suction filter is compressed by the first-stage compressor and is discharged via a discharge port of the first-stage compressor into an intercooler which is an air cooler. Then, the compressed air from an outlet of the intercooler is introduced into the second-stage compressor so as to be compressed. The air thus compressed in the second-stage compressor is introduced into an aftercooler which is an air cooler, and is supplied via an outlet of the aftercooler to the demand. During the supply to the demand being stopped, the air is blown off from the aftercooler via a blowoff pipe, a blowoff silencer being arranged downstream in the blowoff pipe.

The three-stage turbocompressor is constructed such that provided are two or first and second intercoolers and a third-stage compressor. Air sucked through a suction filter is compressed by a first-stage compressor and is discharged via a discharge port of the first-stage compressor into the first intercooler. The compressed air discharged via an outlet of said first intercooler is introduced into the second-stage compressor so as to be compressed. The air thus compressed by the second-stage compressor is introduced into the second intercooler and is thereafter introduced from said second intercooler into the third-stage compressor so as to be further compressed. The air thus compressed by the third-stage compressor is introduced into the aftercooler and is supplied via an outlet of the aftercooler to the demand. During the supply of the compressed air to the demand being stopped, the compressed air is blown off from the aftercooler via the blowoff pipe, noise deadening being effected by a blowoff silencer at a downstream end of the blowoff pipe so as to prevent the noise from being generated during blowoff.

In such two- or three-stage turbocompressor, conventionally the blowoff silencer at the downstream end of the blowoff pipe is not mounted on the compressor but is arranged separately to be connected to the blowoff pipe; in this case, the silencer itself is made longer to increase an amount of sound absorbed. On the compressor, a simple muffler is mounted.

The blowoff silencer not mounted on the compressor but arranged separately in the two-stage turbocompressor has been proposed (See, for example, JP 2001-289168A).

The two-stage turbocompressor has been known in which integrally fabricated by casting are compressing sections of the first- and second-stage compressors, a receptacle for a power transmission mechanism which transmits a drive force for compressing operations of the compressing sections, a cooler casing for two air coolers, compressed air passages connecting the first- and second-stage compressors to the air coolers, respectively, the two air coolers being housed in said cooler casing in a partitioned manner (See, for example, JP 8-93685A and JP 10-252681A).

In the three-stage compressor, as schematically shown in FIG. 3, first-, second- and third-stage compressors 31, 32 and 33 are arranged; a discharge port of the first-stage compressor 31 and a first intercooler 34 are interconnected by a compressed air passage 37 so as to be integrally structured; an outlet of the first intercooler 34 and a suction port of the second-stage compressor 32 are interconnected by a compressed air passage 38 so as to be integrally structured; the second-stage compressor 32 and a second intercooler 35 are interconnected by a compressed air passage 39 so as to be integrally structured; and an outlet of the second intercooler 35 and an suction port of the third-stage compressor 33 are interconnected by a compressed air passage 40 so as to be integrally structured. The third-stage compressor 33 is connected via a compressed air passage 41 to an aftercooler 36. In such structure, integrally fabricated by casting into an integral cast casing in the same manner as in the two-stage compressor mentioned above are compressing sections of the respective stage compressors 31, 32 and 33, a receptacle for a power transmission mechanism which transmits a drive force for compressing operations of the respective compressing sections, a receptacle for two intercoolers 34 and 35 and compressed air passages 37, 38, 39 and 40 sequentially interconnecting the first-stage compressor 31, the first intercooler 34, the second-stage compressor 32 and the second intercooler 35. Only the two intercoolers 34 and 35 are incorporated in the integral cast casing; separately arranged is the aftercooler 36 to which the discharge port of the third stage compressor 33 is connected via an extension of the compressed air passage 41.

The blowoff silencer not mounted on the compressor but arranged separately as shown in JP 2001-289168A has problems that constructing the blowoff pipe is much troublesome and that space for installing the silencer must be ensured. On the other hand, in a case where the blowoff silencer is mounted on the compressor, no problem will occur if sufficient space for installation of the silencer is secured; however, if the place cannot be secured for the reason of, for example, space saving of the compressor, the silencer itself has to be made compact and simple, resulting in insufficient noise deadening.

In the two-stage turbocompressor in the form of integral cast casting as shown in JP 8-93685A and JP 10-252681A, the compressing sections of the compressors and the compressed air passages are integrally fabricated, so that the two-stage turbocompressor is applicable only for two-stage compression; similarly, a three-stage turbocompressor is applicable only for three-stage compression. Accordingly, the three-stage compressor cannot be used for, for example, one or two-stage compression and therefore cannot cope with special use.

Furthermore, though the two-stage turbocompressor may be in the form of integral cast casing with two air coolers being incorporate therein as shown in JP 8-93685A and JP 10-252681A, there has been no three-stage turbocompressor with three air coolers being incorporated in an integral cast casing; in fact, generally only two intercoolers are incorporated in the integral cast casing and the aftercooler is arranged separately or placed centrally.

Accordingly, there are problems that the number of the parts is increased and that the structure is made larger due to increase of installation area caused by such separate arrangement; the air pipe for connecting the third-stage compressor with the aftercooler must be extended, which leads to increase in pressure loss and thus deterioration in performance. JP 8-93685A and JP 10-252681A do not show three coolers incorporated in a casing in a three-stage turbocompressor at all.

Thus, an object of the invention is to provide a turbocompressor which can achieve space saving with respect to installation of a blowoff silencer so as to enhance noise deadening effect and which may be a three-stage turbocompressor compact in size and easily cope with one or two-stage compression.

SUMMARY OF THE INVENTION

In order to overcome the above-mentioned problems, a suction filter according to the invention comprises separate filter elements arranged in an air flow path from a suction section to a discharge section, air sucked through each of said filter elements being introduced into said discharge section; filter elements may be laterally separately arranged in a casing with suction and discharge sections, air sucked through said laterally separated filter elements being introduced into said discharge section. As a result, when a filter element replacement work is to be conducted, one filter element can be replaced while the remaining filter elements can continue sucking the air. During replacement of the filter element, an amount of air sucked through the filter-element mount from which the filter element has been detached for replacement may be a little, so that a probability of the foreign matter being sucked can be reduced. In this respect, even when the opening on the filter-element mount from which the filter element has been detached is closed, the whole resistance is still smaller and hardly affects on the operation of the compressor; such closing of the opening ensures no foreign matter to be sucked through the mount from which the filter element has been detached.

The casing may be provided centrally therein with a chamber which is a sealed structure, separate filter elements being arranged on opposite sides of the chamber, an interior of the sealed structured chamber being communicated with an exterior of the chamber through the respective filter elements and communicated with the discharge section. This enables a number of filter elements to be arranged on opposite sides of the chamber and thus enables the filter elements to be smaller in size so that opening areas on the filter-element mounts may be smaller, which leads to further reduction in probability of foreign matter being sucked during the filter element replacement work.

The casing outside of the filter elements may have sides each formed with a window corresponding the whole size of the filter elements arranged on the side, said window being adapted to be sealed by a lid which can be opened and closed. Thus, replacement of each filter element can be readily conducted through the corresponding window.

In order to overcome the above-mentioned problems, a turbocompressor and a method for compact assembling of the same according to the invention comprises an integral cast casing with first-, second- and third-stage compressors and with all of air coolers corresponding to said compressors being incorporated therein, said respective stage compressors being connected to the corresponding air coolers through compressed air passages, respectively, the incorporated air coolers in the integral cast casing being first and second intercoolers and an aftercooler.

This provides the air coolers housed in the thick cast. Especially, the aftercooler of the three-stage turbocompressor can be incorporated in the cast which is also provided with the power transmission mechanism, so that sound of the compressed air passed through the passages and sound of toothed gears meshing with each other can be reduced. The compressed air passages connecting the respective coolers with the corresponding compressors can be short in length, which leads to reduction in pressure loss of the compressed air and enhancement of the performance. Moreover, number of parts can be reduced and space saving can be attained.

The compressed air passages for communication of the outlets of the first and second intercoolers with the inlets of the second- and third-stage compressors, respectively, are in the form of pipes detachably attached to the corresponding cooler outlets and to the corresponding compressor inlets, respectively. This makes it possible that a single compressor is applicable for any of three-, two- and one-stage compressions so that the compressor can readily cope within any pressure range requirement at the demand.

In the three-stage compressor, first and second intercooler and an aftercooler may be arranged and incorporated in an integral cast casing in the order named and partitioned by partitions, an outside of the aftercooler being in the form of arc. This will decrease pressure differences between the respective coolers so that stresses on the partitions can be reduced and stress on the aftercooler can be relieved.

Moreover, an oil tank may be arranged on a side of the integral cast casing, a blowoff silencer being placed between the oil tank and the integral cast casing so as to be pinched therebetween, the blowoff silencer being connected to the aftercooler through a blowoff pipe. Because of the blowoff silencer being arranged between the cast and the oil tank charged with lubricant, noise transmitted through a surface of a housing of the silencer can be reduced and effective space utilization can be attained, leading to space saving.

The method for compact assembling of the turbocompressor comprises integrally fabricating compressing sections of a three-stage compressor and compressed air passages by casting, and then housing intercoolers and an aftercooler in air-cooler receptacles in the integral cast casing for incorporation thereof in the integral cast casing, and then connecting the intercoolers and the aftercooler with the respective stage compressors via compressed air passages. The method for compact assembling of the turbocompressor comprises fabricating the integral cast casing with the three air-cooler receptacles partitioned therein, and then housing the first and second intercoolers and the aftercooler in the three receptacles formed in said integral cast casing for incorporation thereof, the respective coolers being connected to the respective stage compressors thorough the compressed air passages. As a result, a turbocompressor with three incorporated coolers can be readily assembled by fabricating the integral cast casing and housing two intercoolers and an aftercooler in cooler receptacles formed in said integral cast casing.

BEST MODE FOR CARRYING OUT THE INVENTION

An embodiment of a suction filter according to the invention will be described with reference to the drawings.

Figure 4:
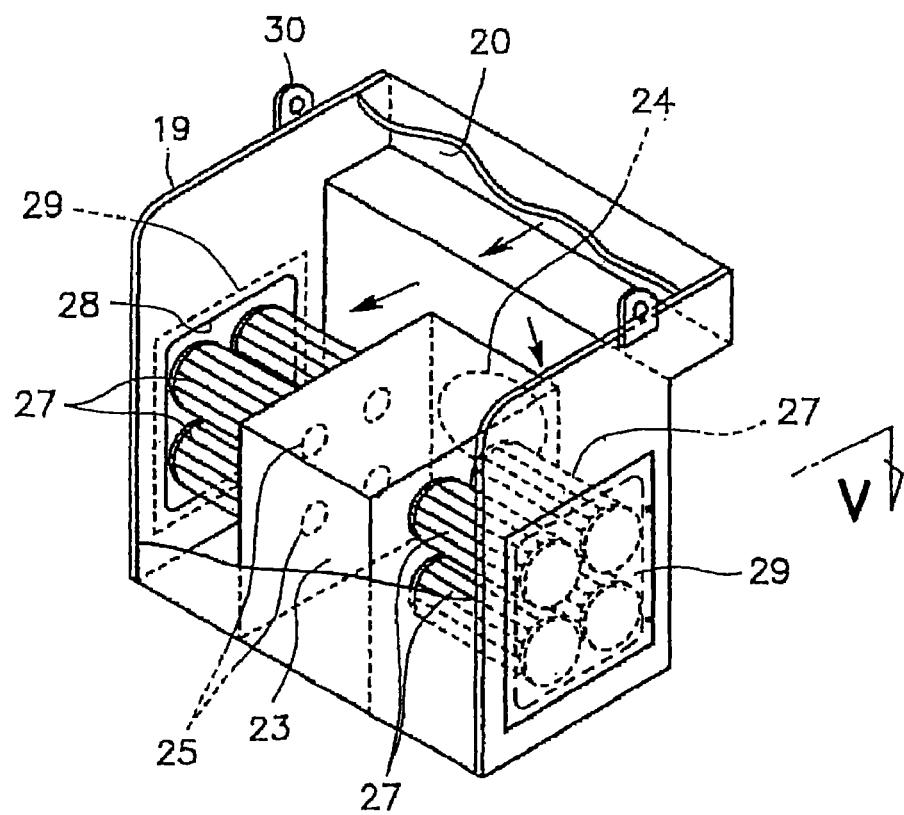
FIG. 4 is a perspective view partly in section showing an embodiment of a suction filter according to the invention.
Figure 5:
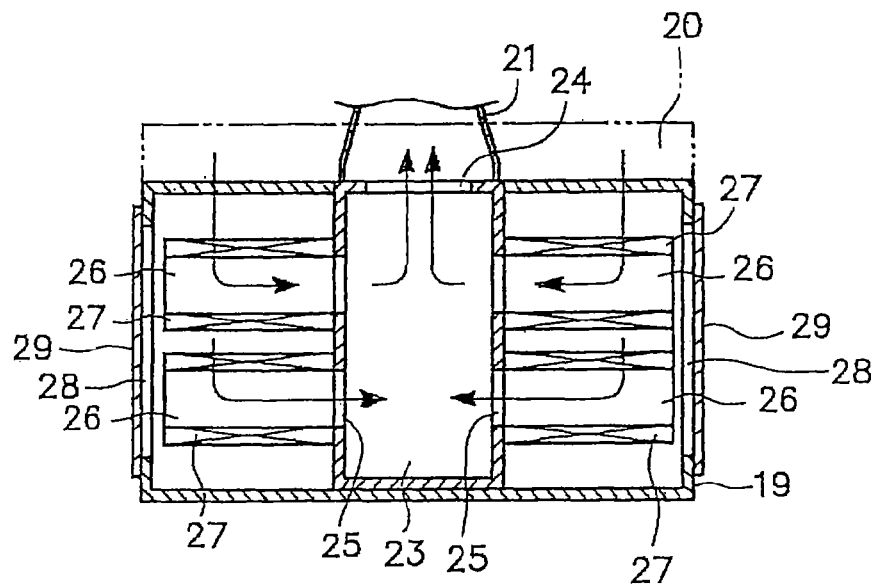
FIG. 5 is a plan view in section looking in the direction of the arrow V in FIG. 4.

FIGS. 4 and 5 show an embodiment of a suction filter according to the invention. A casing 19 with suction and discharge sections 20 and 21 is interiorly provided with a central chamber 23 which is a sealed structure with required thickness and height. A front or back side of the chamber 23 is formed with an opening 24 for communication with the discharge section 21 and each lateral side surface or each side surface in the direction of thickness of the chamber 23 is formed with four openings 25. A small-diameter cylindrical mount 26 for a filter element and with peripheral openings is mounted on the surface external of the corresponding opening 25 and is laterally and horizontally protruded. Detachably fitted over an outer periphery of each of the filter-element mounts 26 is a small-diameter cylindrical filter element 27. The inflow air via the suction section 20 is laterally separated outside of the chamber 23 to be sucked via each of the filter elements 27, each of the filter-element mounts 26 and each of the openings 25 into the chamber 23 and is discharged from the chamber 23 via the opening 24 into the discharge section 21 where it is delivered to a suction line 4 (see FIG. 1).

The casing 19 has opposite lateral side walls each formed with a window 28 larger than an installation region of the four filter elements 27. A sealable lid 29 is attached to the window 28 for free opening and closing.

Reference numeral 30 denotes a hanging piece for hooking of the suction filter according to the invention.

Figure 1:
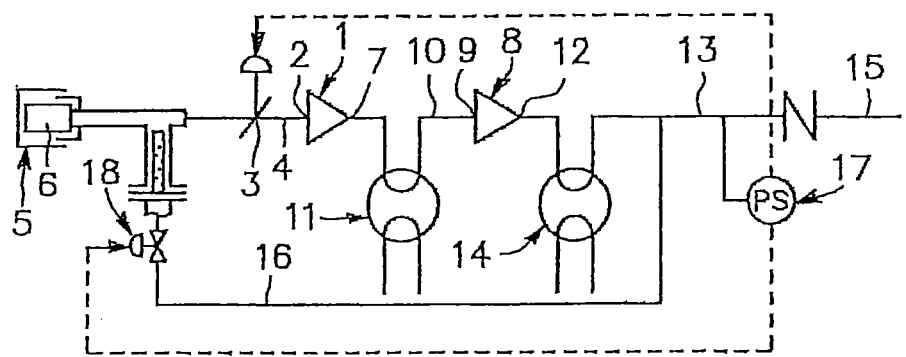
FIG. 1 is a schematic view showing a conventional turbocompressor.
Figure 2:
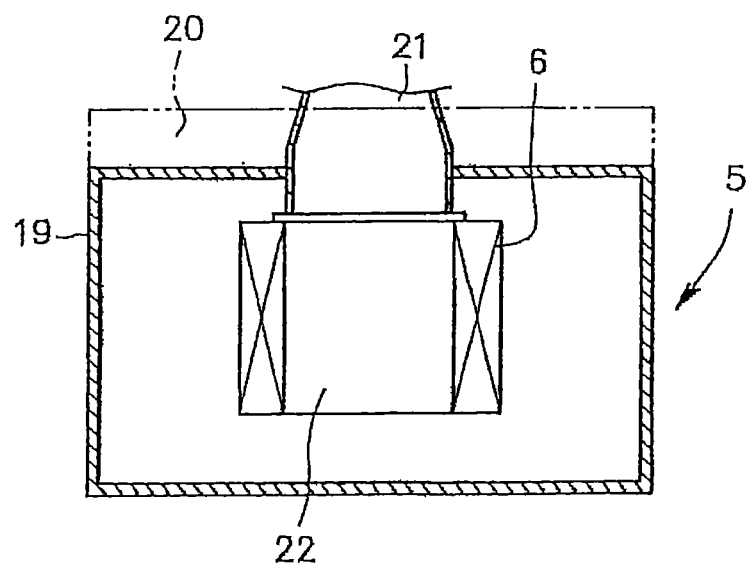
FIG. 2 is a sectional view schematically showing a conventional suction filter.

During an operation of the compressor as shown in FIG. 1, the inflow air from the suction section 20 of the suction filter 5 according to the invention is introduced into the chamber 23 after the foreign matter such as dust is removed by passing the air through each of the totally eight filter elements 27, and then the cleaned air is caused to flow from the opening 24 via the discharge section 21 to the compressor. Accordingly, the air free from the foreign matter is introduced into the first-stage compressor 1. Since the eight filter elements 27 are arranged as two sets of four filter elements on opposite lateral sides and the inflow air from the suction section 20 is sucked all at once by the four filter elements 27 on each lateral side, suction resistance of the air can be reduced in comparison with a case where all of the eight filter elements 27 are arranged at a position in a concentrated manner.

When filter elements 27 are to be replaced during operation of the compressor, all of such filter elements 27 are not required to be replaced at once by new filter elements 27 but any of the filter elements 27 required to be replaced is singly detached one by one to be replaced with new one. In this case, the filter element 27 required to be replaced is detached from the filter-element mount 26; this detachment is easily conducted such that the lid 29 on the side where the filter element 27 required to be replaced exists is opened to take out the target filter element 27 from the filter-element mount 26 via the corresponding window 28. Next, a new filter element 27 or the repaired filter element 27 is attached to the filter-element mount 26 from which the filter element 27 has been detached; thus, the one filter element 27 can be replaced.

In the above, a cover may be attached to the filter-element mount 26 so as to cover the opening on the filter-element mount 26 from which the filter element 27 has been detached; alternatively, the filter-element mount 26 may be left as it is without attaching the cover to the mount.

In the case where the cover is not attached to the filter-element mount 26 from which the filter element 27 has been detached, the window 28 is closed by the lid 29 after the filter element 27 required to be replaced is detached and taken out through the window 28 of the casing 19 and until the attachment work for the new filter element 27 to the mount 26 is started. This causes a part of the sucked air to be sucked through the filter-element mount 26 having no filter element 27; however, since an area of the opening on each of the filter-element mounts 26 is set small, an amount of air flowing therethrough is a little, lowering the probability of the foreign matter being sucked therethrough. A dust remover may be attached to each of the openings 25 as needs demand.

On the other hand, in the case where the opening of the filter-element mount 26 is covered with the cover to prevent the air from being sucked through the opening of the filter-element mount 26 from which the filter element 27 has been detached, no air is sucked through said mount 26. Accordingly, it is possible to preliminarily prevent the foreign matter from being sucked through said filter-element mount 26. Since the inflow air in the casing 19 is sucked through the remaining seven filter elements 27, no trouble occurs on suction of the air.

In the suction filter 5 according to the invention, the filter element 27 is divided into eight small-diameter filter elements so as to be arranged in plural positions, which allows each of the individual filter elements to have reduced weight and thus makes the filter elements 27 compact in size so as to be easily handled; thus, the replacing work can be readily conducted manually without using any large-sized machine such as a crane.

It is to be understood that a suction filter according to the invention is not limited to the above-mentioned embodiment and that various changes and modifications may be effected without leaving the gist of the invention. For example, shown in the above are the two sets of four filter elements 27 on opposite lateral sides or totally eight filter elements 27; however, the number of the filter elements may be any, not limited to eight. The respective filter elements 27 shown have equal diameters; however, the filter elements may have different diameters.

As is clear from the above, a suction filter according to the invention can have the following excellent effects and advantages.

(1) Filter elements are separate ones arranged in an air flow path from a suction section to a discharge section, air sucked through each of the filter elements being introduced into the discharge section; the filter elements may be laterally separately arranged in a casing with suction and discharge sections, air sucked through the laterally separated filter elements being introduced into the discharge section. As a result, when a filter-element replacement work is to be conducted without stopping the air suction, one or some of the filter elements may be replaced while the suction of the air is continued by the remaining filter elements. Thus, an amount of air sucked through the filter-element mount or mounts from which the filter element or elements have been detached for replacement may be a little, so that a probability of the foreign matter being sucked can be reduced.

(2) With respect to item (1) above, when the opening on the mount from which the filter element has been detached is closed by a cover, then the foreign matter can be prevented from being sucked through the opening on the mount.

(3) The separate filter elements may be arranged on opposite sides of a chamber with a sealed structure and provided interiorly and centrally of a casing, the interior of the chamber being communicated with the exterior of the chamber through each of the filter elements and with the discharge section. This makes it easy to arrange a lot of filter elements in the opposite sides of the chamber. As a result, each of the filter elements may be made compact in size, which facilitates handling of the same upon replacement and makes it possible to make smaller the area of the opening of the corresponding mount, leading to further lowering the probability of the foreign matter being sucked through the mount during replacement work of the filter element.

(4) The sides of the casing outwardly of the filter elements may have windows each having the size corresponding to the grouped filter elements, each of said windows being sealable by a lid which may be freely opened and closed; this makes it possible to easily replace the filter elements one by one through the window.

An embodiment of a turbocompressor and a method for compact assembling of the same according to the invention will be described with reference to the drawings.

FIGS. 6 to 12 show an embodiment of the turbocompressor and the method for compact assembling of the same according to the invention. An integral cast casing I is provided by integrally casting scrolls 31a, 32a and 33a serving as compressing sections of first-, second- and third-stage compressors 31, 32 and 33, respectively, which constitute together a three-stage compressor, receptacles 34a and 35a for first and second intercoolers 34 and 35, respectively, a receptacle 36a for an aftercooler 36, compressed air passages 37 and 39 introducing the compressed air from the scrolls 31a and 32a to the receptacles 34a and 35a, respectively, a receptacle 42 for a power transmitting mechanism, an aftercooler outlet 43 and a blowoff outlet 44. The three air coolers 34, 35 and 36 are incorporated in the single casting; that is, the first and second intercoolers 34 and 35 and the aftercooler 36 are housed in the receptacles 34a, 35a and 36a of the integral cast casing I. The integral cast casing I has on its one side an oil tank 45. A blowoff silencer 46 is arranged to be pinched between the oil tank 45 and the cast casing I. Outlets of the first and second intercoolers 34 and 35 are connected to suction ports of the second- and third-stage compressors 32 and 33 by detachable second- and third-stage suction pipes 47 and 48, respectively.

Figure 11:
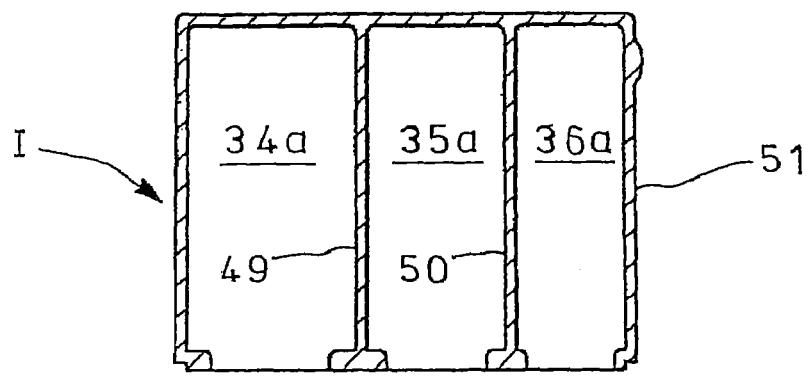
FIG. 11 is a plan view in section showing receptacles for air coolers formed in the integral cast casting.
Figure 12:
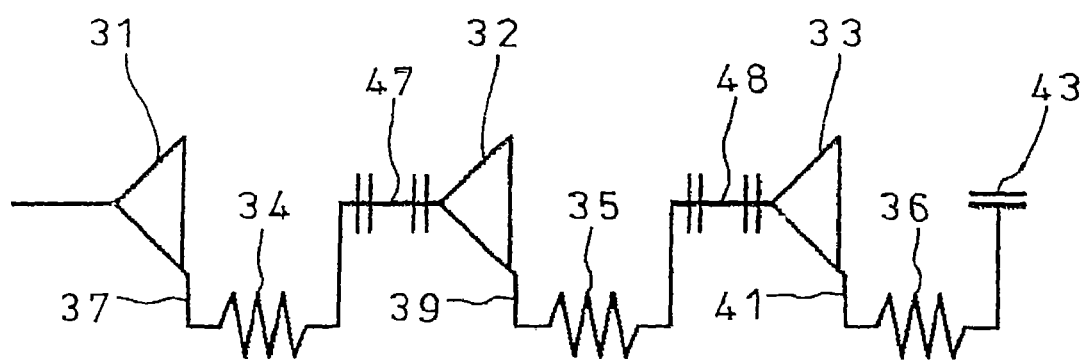
FIG. 12 is a schematic view showing a fundamental structure of the turbocompressor according to the invention.

More specifically, the three receptacles 34a, 35a and 36a for the air coolers formed side by side within the cast casing are in parallel with each other, as is clear from the sectional view of FIG. 11; the first and second intercoolers 34 and 35 and the aftercooler 36 are housed in the respective receptacles 34a, 35a and 36a so as to be arranged laterally from one end side of the casing in the order named, i.e., in the order of their lowness in pressure, whereby they are incorporated side by side in the integral cast casing I. The first and second intercoolers 34 and 35 and the aftercooler 36 are partitioned respectively by partitions 49 and 50 having required thickness, the receptacle 36a for the aftercooler having an outer side wall 51 in the shape of arc to relieve any stress.

The receptacle 42 for the power transmission mechanism is centrally formed in the integral cast casing I. Arranged in the receptacle 42 are a larger-diameter gear 53 rotated by a drive shaft 52 coupled to a drive (not shown), smaller-diameter speed-up gears 54 and 55 in mesh with the gear 53, a rotary shaft 56 integral with the gear 54, a rotary shaft 57 integral with the gear 55 and bearings for rotatably supporting the rotary shafts 56 and 57 so as to transmit drive force in enhanced manner with increase in speed. Moreover, mounted on one and the other ends of the rotary shaft 56 are impellers 58 and 59 which are arranged in the scrolls 31a and 32a of the first- and second-stage compressors, respectively. The impellers 58 and 59 are rotated at higher speed by the rotary shaft 56 so that compression is conducted in the first- and second-stage compressors 31 and 32. Mounted on one end of the rotary shaft 57 is an impeller 60 which is arranged in the scroll 33a of the third-stage compressor. The impeller 60 is rotated at higher speed by the rotary shaft 57 so that compression is conducted by the third-stage compressor 33. Further, an upper half cover 61 covering the gears 53, 54 and 55 and the rotary shafts 56 and 57 is detachably fitted to an upper opening of the receptacle 42 of the power transmitting mechanism; detachment of the cover 61 makes it easy to access to and conduct maintenance for each part of the power transmitting mechanism.

Figure 3:
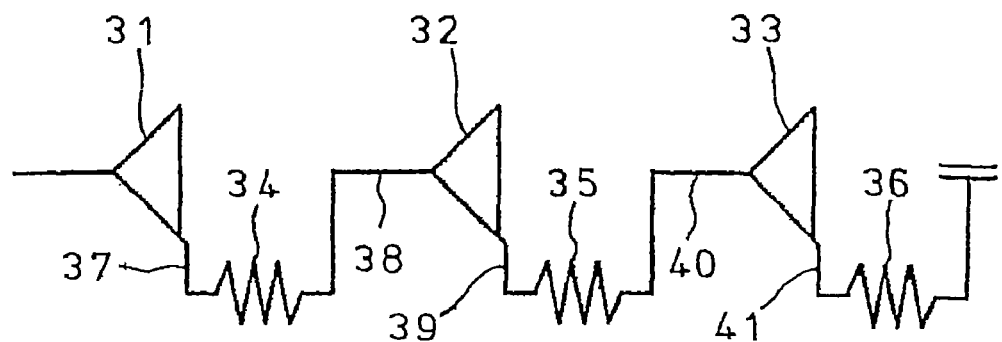
FIG. 3 is a schematic view showing a conventional three-stage compressor.

In the three-stage compressor constituted by the first-, second- and third-stage compressors 31, 32 and 33 with incorporation of the above-mentioned power transmitting mechanism and with the rotation of the impellers 58, 59 and 60, the compressed air passages 37, 39 and 41 integrally fabricated in the integral cast casing I intercommunicate the outlet of the first-stage compressor 31 and the inlet of the first intercooler 34, the outlet of the second stage compressor 32 and the inlet of the second intercooler 35, and the outlet of the third stage compressor 33 and the inlet of the aftercooler 36, respectively. In place of the compressed air passages 38 and 40 fixed to the conventional integral cast casing shown in FIG. 3, the present invention employs second- and third-stage suction pipes 47 and 48 which are constructed separately of the integral cast casing I and which are detachably mounted to the outlet of the first intercooler 34 and the inlet of the second stage compressor 32 for intercommunication between them and to the outlet of the second intercooler 35 and the inlet of the third-stage compressor 33 for intercommunication between them, respectively. Thus, by the detachable attachment of the second- and third-stage suction pipes 47 and 48, the three-stage compressor can appropriately cope with two- or one-stage compression.

The integral cast casing I is provided, on its one side or its side adjacent to the drive shaft 52, with an oil tank 45 on which the drive (not shown) is mounted to drive the respective stage compressors 31, 32 and 33 through the drive shaft 52; and the blowoff silencer 46 is placed between the oil tank 45 and the integral cast casing I so as to be pinched therebetween and located adjacent to the aftercooler 36, the silencer 46 being connected to the blowoff outlet 44 by a blowoff pipe 62.

The blowoff silencer 46 is constructed such that a plurality of diffusers 65a and 65b are attached to a housing 63 which forms a noise deadening space 64, a compressed air distribution section 66 being provided on an inlet side of the respective diffusers 65b. Thus, the compressed air from the blowoff pipe 62 is passed through the diffusers 65a so as to be once reduced in speed and in noise, is passed through the distribution section 66, is passed through the diffusers 65b so as to be reduced in speed and in noise and is allowed to expand in the noise deadening space 64. Due to bypass through the noise deadening space 64, the compressed air is noise-deadened and is discharged through a discharge port 67.

When the three-stage compressor as mentioned above is operated to supply the compressed air to the demand, the drive force from the drive is transmitted via the drive shaft 52, the gears 53, 54 and 55 and the rotary shafts 56 and 57 in the order named to rotate the impellers 58, 59 and 60. Thus, the first-, second- and third-stage compressors 31, 32 and 33 start to be operated and the air free from the foreign matter such as dust is sucked through the suction filter (not shown) into the first-stage compressor 31 at its inlet so as to be compressed. The compressed air discharged from the first-stage compressor 31 is passed through the compressed air passage 37 integrally fabricated in the integral cast casing I and is introduced into the first intercooler 34 so as to be cooled. Then, the compressed air is passed through the second-stage pipe 47 and is introduced into the second-stage compressor 32 at its suction port so as to be compressed. The compressed air discharged via the discharge port of the second-stage compressor 32 is passed through the compressed air passage 39 integrally fabricated in the integral cast casing I and is introduced into the second intercooler 35.

The compressed air from the second intercooler 35 is passed through the third-stage suction pipe 48 and is introduced into the third-stage compressor 33 via its suction port so as to be further compressed. The further compressed air discharged via the discharge port of the third-stage compressor 33 is passed through the compressed air passage 41 integrally fabricated in the integral cast casing I, is introduced into the aftercooler 36, and is then taken out via the outlet 43 of the aftercooler 36 so as to be supplied to the demand.

In the above, the turbocompressor according to the invention, which has the two intercoolers 34 and 35 and the single aftercooler 36 or the totally three air coolers incorporated in the integral cast casing I, is required to have no increased installation area in comparison with a conventional three-stage compressor in which an aftercooler is arranged separately. Accordingly, space saving can be attained and the number of the parts can be reduced; the whole structure can be made compact in size in cooperation with the compressor main parts structured on the integral cast casing I. Since the first and second intercoolers 34 and 35 and the aftercooler 36 are arranged in the order named, it is possible to shorten the compressed air passages 37, 39 and 41 and the suction pipes 47 and 48 between the respective stage compressors 31, 32 and 33, so that the pressure loss of the compressed air can be minimized to achieve high performance and low noise. Since the first and second intercoolers 34 and 35 and the aftercooler 36 are arranged side by side and are incorporated in the integral cast casing I, the partitions 49 and 50 between the intercoolers 34 and 35 and between the intercooler 35 and the aftercooler 36, respectively, can be made to have smaller thickness due to the small pressure difference between the coolers; the stress can be relieved outside of the aftercooler 36 since the outer side wall 51 is in the form of arc.

When blowoff is to be conducted during the supply of the compressed air to the demand being stopped, the compressed air is introduced via the blowoff pipe 62 into the blowoff silencer 46 so as to be blown off. During this time, the compressed air from the pipe 62 to the silencer 46 is reduced in speed and in noise in the diffusers 65a and 65b and is discharged to the noise deadening space 64 where it is allowed to expand, and by bypass through the space 64 the compressed air is noise-deadened, and is discharged. According to the invention, the blowoff silencer 46 is placed to be pinched between the integral cast casing I and the oil tank 45, so that noise transmitted through the surface of the housing 63 of the silencer 46 can be reduced to further improve the noise deadening effect. Because of its incorporation on the side of the integral cast casing I, the installation space can be effectively utilized and space saving can be attained in comparison with a case where it is placed separately, thereby contributing to compactness in size of the whole structure.

When the demand has different compressed-air pressure requirement, it is required to cope within the pressure range.

In the turbocompressor according to the invention, the compressed air passages for intercommunicating the outlet of the first intercooler 34 and the suction port of the second stage compressor 32, and the outlet of the second intercooler 35 and the suction port of the third stage compressor 33, respectively, are not integrally fabricated in the integral cast casing I but are formed as the second- and third-stage suction pipes 47 and 48 which are detachable. Accordingly, the three-stage compression mentioned in the above can be readily changed into two- or single-stage compression.

Figure 6:
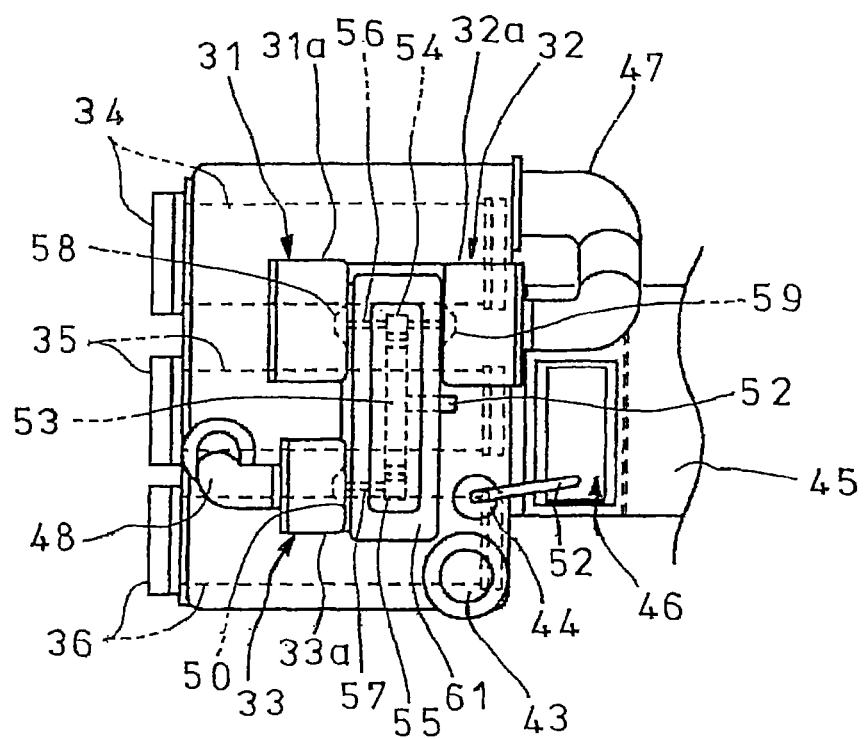
FIG. 6 is a plan view showing an embodiment of a turbocompressor according to the invention.
Figure 7:
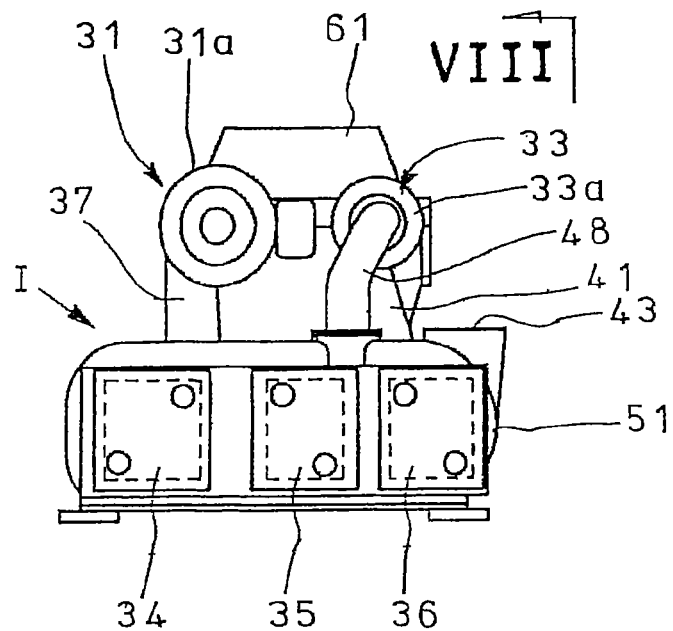
FIG. 7 is a side view of FIG. 6.
Figure 8:
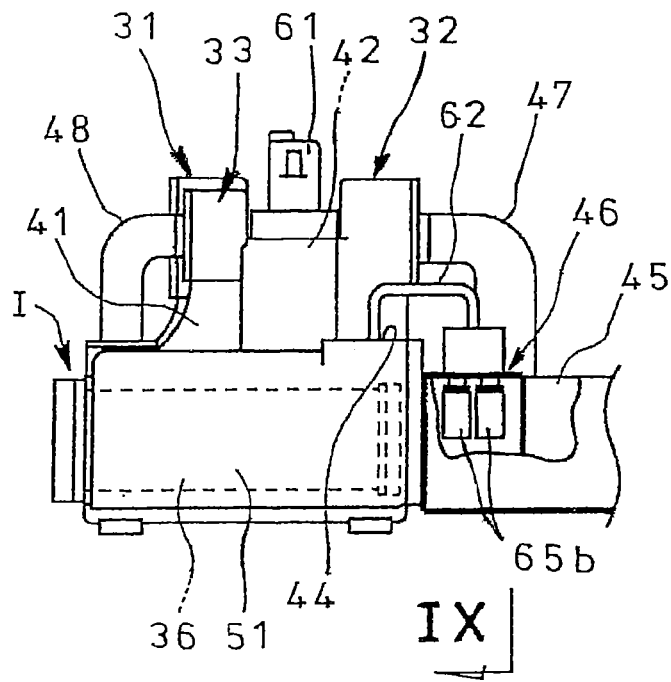
FIG. 8 is a side view looking in the direction of arrow VIII in FIG. 7.
Figure 9:
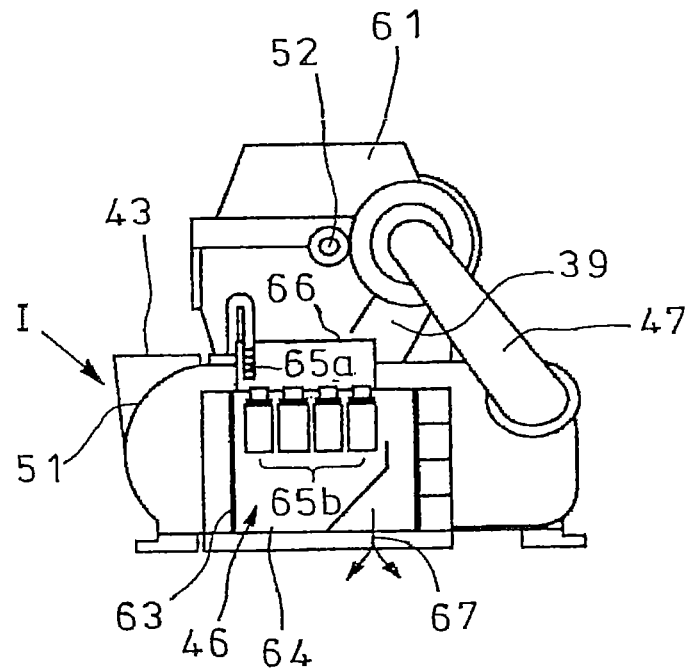
FIG. 9 is a side view looking in the direction of arrow IX in FIG. 8.
Figure 10:
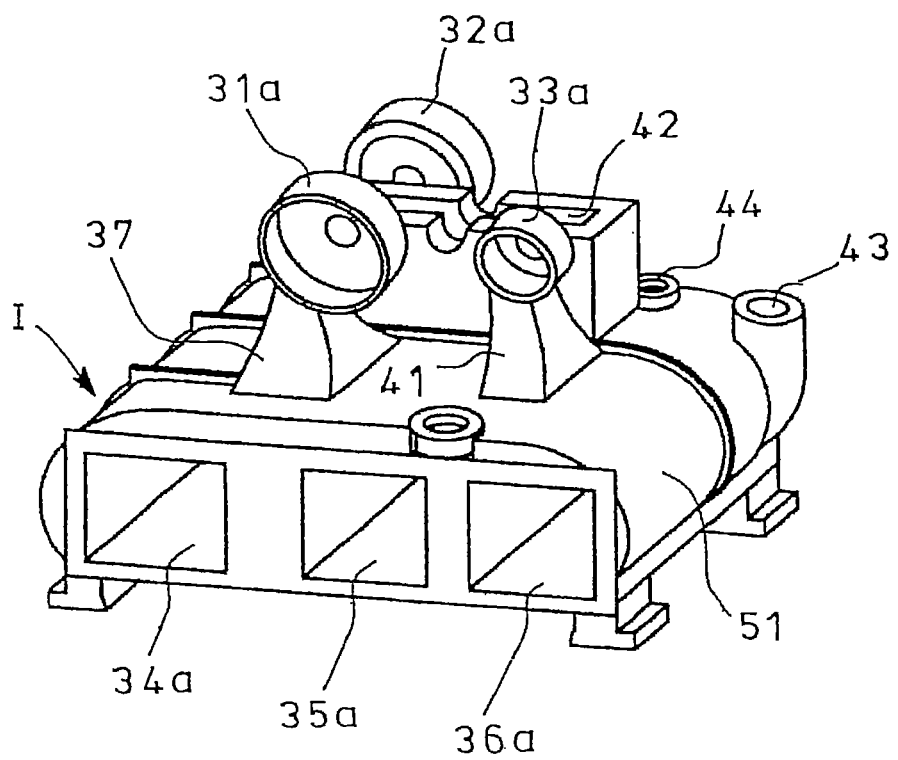
FIG. 10 is a perspective view showing an integral cast casing in a turbocompressor according to the invention.
Figure 13:
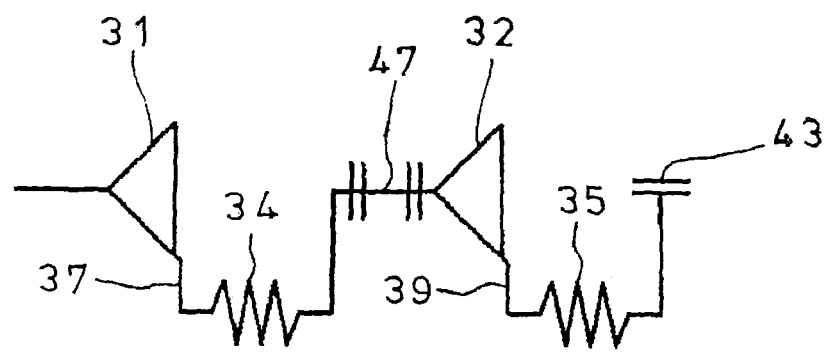
FIG. 13 is a schematic view showing an application of the turbocompressor according to the invention to two-stage compression.

For example, when the required pressure range is two-stage compression, generally the third-stage suction pipe 48 shown in FIGS. 6-8 is detached to provide the two-stage compression by means of the first- and second-stage compressors 31 and 32. As outlined in FIG. 13, the second intercooler 35 is used as the aftercooler and the outlet of the second intercooler 35, as the aftercooler outlet 43. The outlet 43 of the aftercooler 36 shown in FIGS. 6-9 is closed.

This makes it possible to use the compressed air passages 37 and 39 integrally fabricated in the integral cast casing I as well as the second-stage suction pipe 47 as they are so as to provide the shortest air flow path for the compressed air, advantageously resulting in extremely small pressure loss. The blowoff is conducted by branching the pipe from the outlet of the second intercooler 35, closing the blowoff outlet 44 of the casing I and using the blowoff pipe 62.

Figure 14:
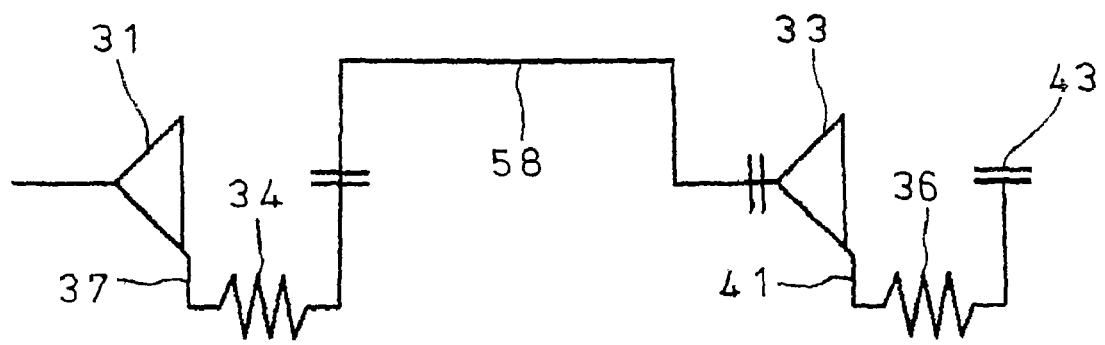
FIG. 14 is a schematic view showing a further application of the turbocompressor according to the invention to two-stage compression.
Figure 15:
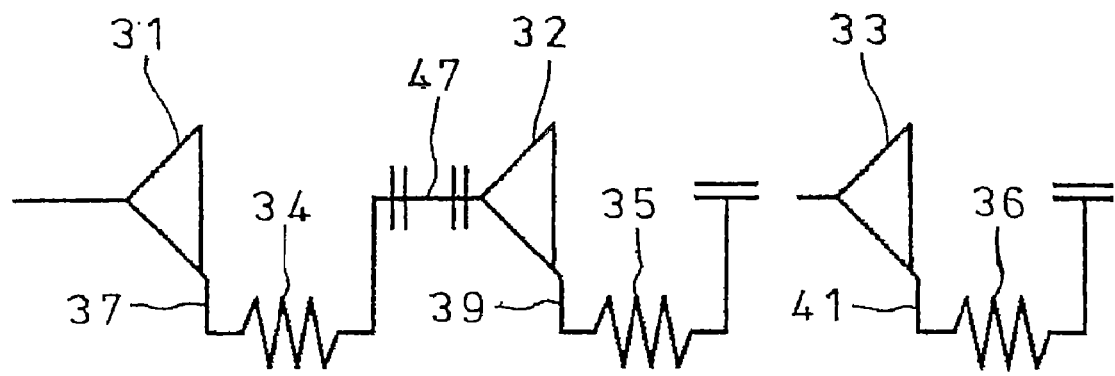
FIG. 15 is a schematic view showing a still further application of the turbocompressor according to the invention.
Figure 16:
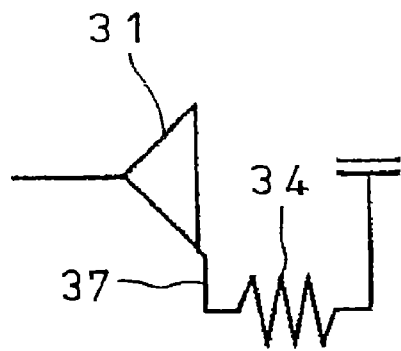
FIG. 16 is a schematic view showing an application of the turbocompressor according to the invention to one-stage compression.

Alternatively, the two-stage compression may be provided by a combination of the first- and third-stage compressors 31 and 33 with no use of the second-stage compressor 32. In this case, in place of the second- and third-stage suction pipes 47 and 48 in FIG. 6, a new suction pipe 68 (see FIG. 14) is prepared as a pipe longer than the pipes 47 and 48 through which the outlet of the first intercooler 34 is directly communicated with the suction port of the third-stage compressor 33. FIG. 14 shows Moreover, a combination of two systems may be applied; that is, for example, the two-stage compression using the first- and second-stage compressors 31 and 32 may be combined with a booster constituted only by the third-stage compressor 33 as shown in FIG. 15. Furthermore, the one- or single-stage compression may be attained by detaching the second-stage suction pipe 47 shown in FIG. 6 from the outlet of the first intercooler 34; a compressed air pipe to the demand is connected to the outlet of the intercooler 34. FIG. 16 shows an outline thereof.

Thus, the respective stage compressors may be freely modified.

It is to be understood that the turbocompressor and the method for compact assembling of the same according to the invention are not limited to the embodiments mentioned above and that various changes and modifications may be made without leaving the gist of the invention. For example, the blowoff silencer 46 may be of a structure other than illustrated. A blowoff valve is, of course, provided in the blowoff pipe 62 and is closed during the supply of the compressed air from the outlet of the aftercooler 36 to the demand. The suction filter may be installed on the integral cast casing I so as to the structure compact in size.

As mentioned above, the turbocompressor and the method for compact assembling of the same according to the invention can have the following excellent effects and advantages.

(1) The integral cast casing with the first-, second- and third-stage compressors has all the air coolers incorporated which correspond to the respective stage compressors, said respective stage compressors being connected to the air coolers through compressed air passages, the air coolers being incorporated as first and second intercoolers and an aftercooler. As a result, due to the thick cast, sound of the compressed air passed through the passages and sound of toothed gears meshing with each other can be substantially reduced to minimize undesired noise and to make the structure compact in size. Such compactness in size brings about shortness in length of the compressed air passages connecting the respective coolers to the respective stage compressors; as a result, the pressure loss of the compressed air can be minimized to attain high performance, reduction in number of the parts and space saving.

(2) The compressed air passages for communication of the outlets of the first and second intercoolers with the inlets of the second- and third-stage compressors, respectively, are in the form of pipes detachably attached to the respective cooler outlets and to the respective compressor inlets, respectively. This makes it possible that a single compressor is applicable for any of three-, two- and one-stage compression so that the compressor can readily cope within any pressure range requirement at the demand.

(3) The three air coolers arranged and incorporated in the integral cast casing are first and second intercoolers and an aftercooler in the order named. As a result, the pressure difference between the respective air coolers becomes small, leading to lower the stress in partitions between the coolers. Since the aftercooler is arranged outermost, arrangements using pipes may be readily conducted to apply to various arrangement requirements. Since the outer side wall of the aftercooler is in the form of arc, the stress relief can be obtained.

(4) The integral cast casing has an oil tank on its side, a blowoff silencer being pinched between the oil tank and the integral cast casing and being connected to the aftercooler through the blowoff pipe. As a result, noise transmitted through a surface of a housing of the silencer positioned between the oil tank and the casting can be substantially reduced; it is possible to enlarge the sound reducing effect in comparison with the space; it is possible to shorten the distance between the aftercooler and the blowoff silencer, and it is possible to reduce man-hour for the piping work.

(5) In the method for compact assembling of the turbocompressor, integrally fabricated by casting is an integral cast casing with compressing sections of the three-stage compressor and compressed air passages, receptacles for the air coolers corresponding to the respective stage compressors being formed in the casing in a partitioned manner. Then, intercoolers and an aftercooler are housed side by side in the respective receptacles of the integral cast casing for incorporation thereof, the air coolers being connected to the respective stage compressors through the compressed air passages. The integral cast casing may be fabricated with three cooler receptacles in a partitioned manner; then, the first and second intercoolers and the aftercooler are housed in the receptacles in the order named, the respective coolers being connected to the respective stage compressors through the compressed air passages. As a result, mere fabrication of an integral cast casing makes it possible to obtain the assembly only by assembling the power mechanism transmitting the rotating power to the air cooler and to the compressing section, and it is possible to easily assemble.

INDUSTRIAL APPLICABILITY

As mentioned above, the suction filter according to the invention can reduce or prevent suction of the foreign matter upon replacement of the filter element during the air suction, and makes the replacing work easy. Further, the turbocompressor and the method for compact assembling of the same according to the invention can make the three-stage compressor compact, and make it possible to properly use the three-stage compressor within a pressure range requirement.

We claim:

1. A method for compact assembling of a turbocompressor comprising the steps of:

integrally fabricating an integral cast casing including scrolls for first, second and third-stage compressors, respective air cooler receptacles for housing air coolers corresponding to the respective stage compressors, and respective compressed air passages for introducing compressed air from scrolls of the respective stage compressors into the sides of the respective air cooler receptacles corresponding to the respective stage compressors;

housing the air coolers side by side in the respective air-cooler receptacles in the integral cast casing for incorporation thereof in the integral cast casing; and detachably connecting outlets of the air coolers housed in the air-cooler receptacles corresponding to the first and second-stage compressors, and the inlets of the second and third-stage compressors, respectively, via compressed air pipes.

2. The method for compact assembling of the turbocompressor according to claim 1, wherein the integral cast casing with the three air-cooler receptacles for housing air coolers corresponding to the first, second and third-stage compressors partitioned therein is fabricated with the air coolers corresponding to the first, second and third-stage compressors, wherein the air coolers corresponding to the second and third-stage compressors are respectively partitioned by partitions and then the respective air coolers corresponding to the first, second and third-stage compressors are housed in the order named in said three air cooler receptacles formed in said integral cast casing for incorporation thereof.

* * * * *